Patented Dec. 26, 1939

2,185,122

UNITED STATES PATENT OFFICE 2,185,122

ZEIN CONTAINING COATING COMPOSITIONS

Roy E. Coleman, Meriden, Conn., assignor to The Zein Corporation of America, a corporation of Delaware No Drawing. Application July 18, 1938, Serial No. 219,825

19 Claims. (Cl. 260—6)

This invention relates to liquid coating compositions made from zein or other prolamins suitable for use as air-drying or baking coatings; and more particularly to solutions or coating compositions of zein or other prolamins also containing partially reacted organic compounds or esters having both acid and alcohol functional groups. The coating compositions prepared in accordance with my invention do not separate on standing, have a definitely delayed tendency to gel and, in some instances, are non-gelling over practical periods of time in the order of 3 to 6 months and even more.

In the following description of my invention I refer to the preparation of substantially non-separating, non-gelling, coating compositions of zein derived from corn, but it is, of course, to be understood that my invention is also applicable to the preparation of coating compositions made from other prolamins such as, for example, gliadin from wheat, hordein from barley, kafirin from kafir and the prolamins from other cereal grains. The above-mentioned prolamins are at present ordinarily derived by extraction of the gluten of corn or other grains with an aqueous alcohol solution in which the added water varies generally from about 8% to about 40% of the solvent mixture, the extract so produced being dried, forming a dried prolamin extract which may be completely dried or in commercial form ordinarily containing a small percentage of moisture. Such extracted prolamins, such as zein extracted from corn, may be used in accordance with my invention, although zein or other prolamins obtained in any other suitable manner may also be used.

In my prior applications Serial Nos. 158,209, 158,210, 158,211, 158,212, 158,213, 158,214 and 158,215, filed August 9, 1937, and 158,735, filed August 12, 1937, I have described solutions and liquid coating compositions containing prolamins and particularly zein which are anhydrous or substantially anhydrous and which, in concentrations in which the proportion of solvent to zein is from about 2:1 upward, and more, and particularly from 4 to 5:1, are stable in the cold in that they do not separate or form and deposit a separate phase or layer containing largely zein with a supernatant layer of liquid consisting largely of solvent. The formation of such stable solutions is important in connection with the utilization of zein and similar prolamins in the production of coating compositions and the like, since they enable the zein to be put in a homogeneous and usable form either for direct use or for compounding with other materials, solvents, non-solvents, coating and film-forming materials and the like.

It has been found, however, that some zein solutions, even of the stable character hereinbefore referred to, are limited in their application and use because of a tendency, which frequently appears, to increase in viscosity; that is, to thicken or to become heavier in body; and in many cases to gel. Such tendencies to increase in viscosity, or to gel, while not preventing the utilization of the compositions immediately or within short periods after preparation, do impose serious limitations on their wide-spread commercial application and utilization, since the materials must remain stable and reasonably constant in their characteristics during the periods necessary for transportation and distribution either in bulk or in packages, and to permit of reasonable periods of storage.

In accordance with the present invention, I have developed solutions containing prolamins, and particularly zein, and methods of making the same whereby the tendencies to gel, in which I include the tendency to increase in viscosity which is ordinarily a preliminary of gelling, are retarded and in many cases completely prevented, so as to greatly increase the field of applicability, and permit wider distribution and conventional handling of the manufactured products without material change in characteristics or solidification by gelling over such reasonable periods of time as are involved in such handling and distribution of the materials.

I am of the opinion that the phenomenon of gelling of such solutions and compositions and their increase in body or viscosity as a whole are probably related to the phenomenon of separation, since when separation takes place in many cases the separated phase containing larger proportions of zein is itself a gel in character; and since also in many cases compositions containing zein which tend to separate when the proportion of solvent to zein is as high as about 3:1 and higher will gel as a whole with lower proportions of solvent or higher concentrations of zein; and also since many solutions which are stable and do not separate when the proportion of solvent to zein is from 2 to 2.5 or higher will form gels as a whole if they contain higher proportions of zein. However, in the consideration of the tendency to gel and to increase in viscosity or body as referred to in the present application I have reference to the tendency of solutions to gel as a whole or to increase in viscosity through their entire mass, in cases in which the proportions of solvent to zein are in the order of 2 to 2.5:1 and higher, up to 9 or 10:1, which are the solutions and compositions of a concentration which is most important from the standpoint of the production of films, coatings and the like and which range of concentration is more particularly referred to in my aforesaid prior copending applications, relating to the production of stable solutions. It is to be appreciated that solutions or compositions which are stable and in which the tendencies to gel and to increase in viscosity are adequately retarded or prevented within this range of concentrations may, with higher concentrations of zein, be more likely to form gels; but in any case the compositions prepared in accordance with the present invention will have a less tendency to form gels or to increase in viscosity than the solutions hitherto known.

In accordance with my present invention I have found that I can prepare stable solutions or coating compositions of zein in any practical concentration of zein in the coating compositions in the order of about one part of zein to about two to nine, and up to twenty parts of the solvent when the solvent contains a partially reacted ester which is distinguished by the presence of acid and alcohol functional groups. The liquid coating compositions prepared in accordance with my invention do not separate and have a markedly delayed tendency to gel. The presence of the partially reacted ester in the coating compositions definitely retards or delays gelling thereof to an extent not heretofore obtainable and in many instances prevents gelling over practical periods of time, for example, in the order of about three to six months and even higher. In addition, the coating compositions prepared in accordance with my invention are stable as regards separation at temperatures of 70° F. and below and in many instances at temperatures of 40° F. and somewhat below. While the coating compositions prepared in accordance with my invention are stable as regards separation and gelling in the presence of relatively large percentages of added water, I prefer that my coating compositions contain no added water, or if any, in an amount, in general, not in excess of 5% and preferably less than 5%. Accordingly the coating compositions embodying my invention, are, for practical purposes, substantially non-aqueous.

The partially reacted compounds used as a component of the solvent for zein in accordance with my invention are formed by partially reacting polyhydric alcohols and poly-basic acids to form ester compounds which are simultaneously both acid and alcohol in character; or by partially reacting polyhydric alcohols with an hydroxymonocarboxylic acid. The partially reacted compounds used in accordance with my invention are resinous bodies of the well-known alkyd type. Typical polyhydric alcohols which may be used are glycol, glycerine and their homologues, sorbitol, mannitol, and the like. Typical poly-basic acids which may be used are phthalic, tartaric, succinic, citric, malic, maleic, diphenic, fumaric, glutaric, adipic, pimelic, suberic, azelaic, sebacic, diglycolic, dilactic, salicylacetic, benzophenone-2, 4' dicarboxylic and the like. Hydroxymonocarboxylic acids such as lactic acid may be used in accordance with the present invention. If desired, modified partially reacted alkyd resins of the above type may also be used such as, for example, alkyd resins modified by the incorporation of non-drying oils, non-drying oil acids, drying oils and drying oil acids.

In use, the partially reacted ester compound used in accordance with my invention is dissolved in a suitable solvent which is also a solvent for zein. These solvents include the low molecular weight alcohols, such as methanol, ethanol, denatured alcohols and the like, the glycols such as diethylene glycol, propylene glycol and the like; diacetone alcohols; closed chain alcohols such as benzyl, furfuryl, cyclohexanol; alcohol ethers such as, for example, ethylene glycol monomethyl ether, ethylene glycol monoethyl ether, and the like; lactic acid, ethyl lactate and the like and any mixture of the above.

The quantity of the partially reacted compound used in the solution in accordance with my invention may vary widely from about 3 to 5% by weight up to about 50% by weight and even higher to meet any desired need; although, for most purposes, I have attained satisfactory results when about 5% to about 25% by weight of the solution is the partially reacted compound. The quantity of the solution of the partially reacted compound which may be used to dissolve zein may vary from about 1 part by weight of zein to 2 to 20 parts by weight of the solution and even higher although the most practical solutions are obtained when about 1 part by weight of zein is dissolved in about 2 to 9 parts by weight of the solution.

In carrying out the present invention, the partially reacted compound is first dissolved in the desired solvent and this solution is then mixed with the zein or other prolamin. The mixing may be carried out in any suitable vessel or container such as, for example, a beaker or kettle usually with some stirring and with the application of heat in the order of about 110° to 150° F. and in some instances slightly higher. A stable, non-separating, substantially non-gelling solution of the zein in the solvent mixture is obtained generally in about 3 to 15 minutes, and in most instances satisfactory solutions are obtained in about 5 to 10 minutes with the utilization of heat in the order of about 120° to 135° F.

The present invention is illustrated by the following examples of coating compositions and the methods of preparing the same; however, my invention is not to be construed as limited thereto since other suitable compositions in other suitable proportions are intended to be included within the scope of the claims. In the examples, the term "parts" indicates parts by weight. Also in the examples, when I refer to anhydrous denatured alcohol I have reference to the commercial anhydrous alcohol of the following formula:

|  | Percent |
|---|---|
| Anhydrous ethyl alcohol approximately | 89.3 |
| Anhydrous methyl alcohol do | 4.4 |
| Ethyl acetate do | 6.3 |

When I refer to hydrated anhydrous denatured alcohol, I have reference to an alcohol solvent mixture containing 95% of the above anhydrous alcohol and 4.4% of water.

*Example 1*

2 mols of glycerine and 3 mols of phthalic anhydrid are mixed together in a suitable vessel and heated to about 376° F. for about 10 minutes to form a partially reacted glycerine-phthalic anhydrid resin. 10 parts of this resin are then dissolved in 90 parts of 95% alcohol to form a resin solution.

10 parts of zein are then mixed with 25 parts of the alcohol resin solution and heated to about 110° F. for about 5 to 7 minutes to form a solution of the zein in the alcohol resin solvent. The resulting composition is of a slow or delayed gelling type.

*Example 2*

10 parts of zein are mixed with 50 parts of the alcohol solution of the resin described in Example 1 and heated to about 110° F. for about 5 minutes to form a solution of zein in the alcohol resin solvent. This composition is non-gelling over substantial periods of time.

*Example 3*

2 mols of glycerine are mixed with 3 mols of phthalic anhydrid in a suitable vessel and the mixture heated to about 375° F. for about 5 minutes. The temperature is now raised to about 400° F. and held there for about 20 minutes to form a partially reacted glycerine-phthalic anhydrid resin. 10 parts of this resin are then dissolved in 90 parts of 95% alcohol by heating the mixture to about 120° F. for about 5 minutes.

10 parts of the zein are then mixed with 40 parts of the alcohol solution of the resin and the mixture heated to about 110° to 120° F. for about 5 to 7 minutes to form a solution of the zein in the alcohol resin solvent. The composition is non-gelling over substantial periods of time.

*Example 4*

15 parts of the resin produced in accordance with Example 3 are mixed with 85 parts of anhydrous denatured alcohol and the mixture heated to about 120° F. for about 5 to 7 minutes to form a resin solution.

10 parts of zein are then mixed with 40 parts of this resin solution and the mixture heated to about 90 to 100° F. for about 5 to 7 minutes to form a solution of the zein in the resin solution. This composition does not gel over protracted periods of time, up to 4 to 5 months.

*Example 5*

62 parts of ethylene glycol are mixed with 148 parts of phthalic anhydride and the mixture heated to about 355° F. for about 5 minutes to form a partially reacted ethylene glycol-phthalic anhydrid resin. 5 parts of this resin are now dissolved in 95 parts of hydrated anhydrous denatured alcohol by heating the mixture to about 120° F. for about 5 minutes.

10 parts of zein are now mixed with 50 parts of the resin solution and heated to about 120 to 125° F. for about 5 minutes to form a solution of the zein in the resin solution. This composition is non-gelling over substantial periods of time.

*Example 6*

10 parts of the resin formed in accordance with Example 5 are dissolved in 90 parts of hydrated anhydrous denatured alcohol by heating the mixture to about 110° F. for about 5 minutes.

10 parts of zein are now dissolved in 50 parts of the resin solution and heated to about 120° F. for about 5 minutes to form a solution of the zein in the resin solution. This composition is non-gelling over substantial periods.

*Example 7*

184.12 parts of glycerol are mixed with 354.21 parts of succinic acid in a suitable vessel and heated to about 355° F. for about 10 minutes to form a partially reacted glycerol succinate. 5 parts of the partially reacted glycerol succinate are dissolved in 20 parts of hydrated anhydrous denatured alcohol by heating the mixture to about 120° F. for about 5 minutes.

5 parts of zein are mixed with 25 parts of this resin solution and the mixture heated to about 125° F. for about 5 to 7 minutes to form a solution of the zein in the resin solution. This composition is non-gelling over substantial periods. It forms a very elastic film, somewhat slower in setting and hardening than is general in zein compositions, and having exceptional adhesive characteristics prior to hardening.

*Example 8*

53 parts of the partially reacted glycerin-phthalic anhydrid resin formed in accordance with Example 3 are mixed with 15 parts of hemp seed fatty acids and the mixture heated to about 400° F. for about 20 minutes to form a fatty acid modified alkyd resin. 63.8 parts of this modified alkyd resin are then dissolved in 63.8 parts of 95% alcohol by heating the mixture for about 5 minutes at about 115 to 125° F.

20 parts of the alcohol solution of the modified alkyd resin are then diluted with 20 parts of 95% alcohol. 10 parts of zein are then dissolved in this diluted alcohol solution of the modified alkyd resin by heating the mixture to about 120° F. for about 5 minutes. This composition has retarded gelling properties, and tends to form a soft gel.

The zein solutions or liquid coating compositions embodying my invention have an extremely light, pale, straw color not heretofore attainable in zein solutions made from zein as now commercially available. These solutions have definitely delayed tendency towards gelling and in some instances do not gel even over practical periods of time, for example, in the order of about 3 to 6 months and even higher. Moreover, these solutions are stable in so far as separation is concerned even when cooled to temperatures of 50 to 70° F. and somewhat below. When cooled to temperatures below the limits set for the above, the solutions may, at times, separate or become solid; however, on re-heating again to temperatures of from about 45 to 70° F. a re-solution is effected either without, or with slight stirring and these solutions return to their normal form at the re-heating temperatures. The solutions or coatings embodying my invention may contain added water in an amount greater than 5% although I prefer that they contain no added water or only small amounts of added water below 5%.

The presence of the partially reacted ester compound as a component of the solvent for the zein imparts to the solvent improved solvent properties for zein and added to the zein solutions many improved qualities. For example, the solutions of zein obtained in accordance with my invention are much lighter in color than solutions of zein formed from solvents without the aid of the partially reacted compounds, and the presence of the partially reacted compound imparts to the solutions an improved compatibility with many natural resins, cellulose derivatives and the like. The presence of the various partially reacted alkyd resins tends to plasticize and toughen the zein coatings and in some instances impart tackiness and thermoplasticity thereto. The extent to which these properties are imparted to the zein coating and the character of the property is dependent on the amount of resin present and the composition of the resin as to the polyhydric alcohol and acid used.

The coating compositions embodying my invention have in general the unusual property, particularly when heated, of being able to "give up" their solvent or solvents readily when applied to any surface. Zein-alkyd resin solutions air-dry from about 3 to 30 minutes depending on the particular partially reacted alkyd resin used. With the exception of such solutions to which tackiness has been specifically imparted, they air-dry to hard, tough, non-tacky and generally transparent films. Due to the semi-heat-converting and/or completely heat-converting property of most of the alkyd resins, coatings containing these resins in combination with zein can be baked at temperatures of from about 150° F. to about 250° F. for about 1 to 5 hours to form films of increased hardness and toughness and of very marked water and oil resistance. The zein imparts the characteristic of quick-setting under heat to partially reacted alkyd resins which are normally slow-setting such as, for example, glycol phthalate, glyceryl succinate and the like. In general, the zein appears to harden and improve the quick-setting characteristics of substantially all of the alkyd resins and the alkyd resins in turn appear to plasticize the zein. Films formed from coating compositions embodying the present invention are normally non-blushing, on drying, and in consequence, no supplementary anti-blushing agents are necessary in the coating compositions.

The coating compositions of the present invention may be applied to any surface, including surfaces coated, for example, with varnish, lacquer, rubber or cellulose derivatives. They may be used for coating, sizing, impregnating and waterproofing materials such as paper, textiles, wood, porous stone, wood pulp and the like. When coated on paper, Cellophane, wood, glass and the like, a film is formed by air drying or baking which possesses the film characteristics set forth above. Since these coating compositions have decided adhesive properties and have initial thermo-plastic and heat converting properties, they are especially suitable for uniting or laminating paper, cloth, wood, glass, silk, Cellophane, metals and metal foils and the like.

The characteristics of the solutions or coating compositions embodying my invention and hence of the ultimate films, can be altered at will and as desired by the inclusion in the coating compositions of diluents, modifiers, plasticizers and the like as set forth in my above-identified copending application Serial No. 158,215. The characteristics, such as spread and flow of the coating compositions may also be modified by the addition of a fatty acid, such as, for example, oleic, linseed, hemp seed, lauric and like fatty acids, by the inclusion of blown or bodied drying oils such as blown China-wood oil, or other oxidizing oils, and by the inclusion of cetyl, lauryl, myristyl and like fatty alcohols having 8 or more carbon atoms in a chain. If desired, compatible natural and synthetic resins such as, for example, rosin, sandarac, copal, phenol-aldehyde, urea-aldehyde, vinyl and like resins, or heat-hardening liquid coating compositions of the type described and claimed in my prior co-pending application Serial No. 177,302, filed November 30, 1937, or compatible cellulose derivatives such as, for example, high and low viscosity nitrocellulose, cellulose acetate, ethyl cellulose and like cellulose derivatives may be incorporated with the liquid coating compositions in varying proportions to meet any desired need. Improved water and oil resistant films are obtained by the use of a small amount of a heat-converting urea-aldehyde resin in a baking composition embodying my invention. If desired, suitable fillers such as, for example, those set forth in my application Serial No. 158,215 can be incorporated in the coating compositions. The coatings embodying my invention when mixed with the desired pigments are especially suitable for the production of white and light colored baking enamels for use on metal, wood, glass, paper, cloth and the like.

I claim:

1. A coating composition comprising a solution of a prolamin in a solvent including a substantially neutral, hydroxy organic prolamin solvent and a partially reacted resinous polyhydric alcohol-organic acid ester which is stable as regards separation at temperatures of 70° F., said solvent for the prolamin containing not in excess of 5% of water.

2. A coating composition comprising a solution of a prolamin in a solvent including a substantially neutral, hydroxy organic prolamin solvent and a partially reacted polyhydric alcohol-polybasic acid ester which is stable as regards separation at temperatures of 70° F., said solvent for the prolamin containing not in excess of 5% of water.

3. A coating composition comprising a solution of zein in a solvent mixture comprising a major proportion of a substantially neutral, hydroxy organic zein solvent and a minor proportion of a partially reacted polyhydric alcohol-polybasic acid ester which is stable as regards separation at temperatures of 70° F., said solvent for the zein containing not in excess of 5% of water.

4. A coating composition comprising a solution of zein in a solvent mixture comprising a low-molecular weight alcohol and a partially reacted polyhydric alcohol-polybasic acid ester which is stable as regards separation at temperatures of 70° F., said solvent for the zein containing not in excess of 5% of water.

5. A coating composition comprising a solution of zein in a solvent mixture comprising a glycol and a partially reacted polyhydric alcohol-polybasic acid ester which is stable as regards separation at temperatures of 70° F., said solvent for the zein containing not in excess of 5% of water.

6. A coating composition comprising a solution of zein in a solvent mixture comprising a glycol ether and a partially reacted polyhydric alcohol-polybasic acid ester which is stable as regards separation at temperatures of 70° F. and which is substantially non-gelling, said solvent for the zein containing not in excess of 5% of water.

7. A coating composition comprising a solution of zein in a solvent including a substantially neutral, hydroxy organic zein solvent and partially reacted glyceryl phthalate having functional hydroxyl groups in addition to the ester groups which is stable as regards separation at temperatures of 70° F. and which is substantially non-gelling, said solvent for the zein containing not in excess of 5% of water.

8. A liquid coating composition containing not in excess of about 5% of water comprising zein, a partially reacted resinous polyhydric alcohol-organic acid ester and a substantially neutral hydroxy organic solvent for said zein and ester which is stable as regards separation at temperatures of 70° F. and which is substantially non-gelling.

9. A liquid coating composition containing not in excess of about 5% of water comprising zein, a partially reacted polyhydric alcohol-polybasic acid ester and a substantially neutral hydroxy organic solvent for said zein and ester which is stable as regards separation at temperatures of 70° F. and which is substantially non-gelling.

10. A liquid coating composition containing not in excess of about 5% of water comprising zein, a partially reacted fatty acid modified glyceryl phthalate, and a substantially neutral, hydroxy organic solvent for said zein and phthalate which is stable as regards separation at temperatures of 70° F. and which is substantially non-gelling.

11. A liquid coating composition containing not in excess of about 5% of water comprising zein, a partially reacted hemp seed modified glyceryl phthalate and a substantially neutral, hydroxy organic solvent for said zein and phthalate which is stable as regards separation at temperatures of 70° F. and which is substantially non-gelling.

12. A liquid coating composition containing not in excess of about 5% of water comprising zein, a partially reacted glyceryl phthalate and a substantially neutral, hydroxy organic solvent for said zein and phthalate, and a urea resin which is stable as regards separation at temperatures of 70° F. and which is substantially non-gelling.

13. A liquid coating composition containing not in excess of about 5% of water comprising zein, a partially reacted glyceryl phthalate and a substantially neutral, hydroxy organic solvent for said zein and partially reacted resin which is stable as regards separation at temperatures of 70° F. and which is substantially non-gelling.

14. A liquid coating composition containing not in excess of about 5% of water comprising zein, a partially reacted glyceryl succinate and a substantially neutral, hydroxy organic solvent for said zein and partially reacted resin which is stable as regards separation at temperatures of 70° F. and which is substantially non-gelling.

15. A liquid coating composition containing not in excess of about 5% of water comprising zein, a partially reacted glyceryl lactate and a substantially neutral, hydroxy organic solvent for said zein and partially reacted resin which is stable as regards separation at temperatures of 70° F. and which is substantially non-gelling.

16. A liquid coating composition comprising a solution of zein in a solvent mixture comprising a substantially neutral, hydroxy organic zein solvent and a partially reacted resin having functional hydroxyl groups in addition to ester groups which is formed by partially reacting a polyhydric alcohol of the class consisting of glycols and glycerol with an organic acid, said composition containing not in excess of 5% of water and being stable as regards separation at temperatures of 70° F. and relatively non-gelling.

17. The liquid composition set forth in claim 16 wherein the partially reacted resin is alcohol soluble.

18. The liquid composition set forth in claim 16 wherein the organic acid is selected from the class consisting of poly-basic acids and hydroxy-monocarboxylic acids.

19. A liquid coating composition comprising a solution of zein in a solvent mixture comprising an alcohol and a partially reacted glyceryl-phthalate resin having functional hydroxyl groups in addition to ester groups, said composition containing not in excess of 5% of water and being stable against separation of the zein at temperatures of 70° F. and relatively non-gelling.

ROY E. COLEMAN.